(12) United States Patent
Reed

(10) Patent No.: US 6,665,978 B1
(45) Date of Patent: Dec. 23, 2003

(54) FISHING HOOK BAIT ATTACHMENT DEVICE AND METHOD

(76) Inventor: Ross J. Reed, 4421 13th Ave., Naples, FL (US) 34116

( * ) Notice: Subject to any disclaimer, the term of this patent is extended or adjusted under 35 U.S.C. 154(b) by 0 days.

(21) Appl. No.: 10/210,017

(22) Filed: Jul. 31, 2002

(51) Int. Cl.$^7$ .............................................. A01K 83/06
(52) U.S. Cl. ................................................... 43/44.4
(58) Field of Search ........................... 43/44.2, 44.4, 43/44.6, 44.8

(56) References Cited

U.S. PATENT DOCUMENTS

| | | | | |
|---|---|---|---|---|
| 1,730,957 A | * | 10/1929 | Valiga | 43/44.4 |
| 1,902,217 A | * | 3/1933 | Catarau | 43/44.2 |
| 2,010,598 A | * | 8/1935 | Leighton | 43/44.6 |
| 2,402,730 A | * | 6/1946 | Bucks | 43/44.4 |
| 2,605,579 A | | 8/1952 | Chadwick | |
| 2,932,116 A | * | 4/1960 | Woodzick | 43/44.6 |
| 3,046,689 A | | 7/1962 | Woodley | |
| 3,105,319 A | * | 10/1963 | Whalen | 43/44.4 |
| 3,156,066 A | | 11/1964 | Munyer | |
| 3,193,965 A | * | 7/1965 | Jacobsen | 43/44.4 |
| 3,197,912 A | * | 8/1965 | Kramer | 43/44.4 |
| 3,197,913 A | * | 8/1965 | Rainey | 43/44.8 |
| 3,200,532 A | * | 8/1965 | Walton | 43/44.6 |
| 3,271,890 A | | 9/1966 | Davis | |
| 3,398,477 A | | 8/1968 | Paluzzi | |
| 3,914,896 A | * | 10/1975 | Sahagian | 43/44.6 |
| 4,233,771 A | * | 11/1980 | Robinson | 43/41 |
| 4,466,166 A | | 8/1984 | Hogarth | |
| 4,625,451 A | | 12/1986 | Griffiths | |
| 4,691,467 A | | 9/1987 | Brimmer | |
| 4,785,571 A | | 11/1988 | Beck | |
| 4,848,023 A | * | 7/1989 | Ryder et al. | 43/44.2 |
| 4,947,575 A | * | 8/1990 | Yerkovich | 43/44.4 |
| 5,333,407 A | * | 8/1994 | Merritt | 43/44.4 |
| 5,377,442 A | * | 1/1995 | Gariglio | 43/44.4 |
| 5,517,782 A | * | 5/1996 | Link et al. | 43/42.31 |
| 5,617,668 A | * | 4/1997 | Shimandle | 43/44.8 |
| 5,946,844 A | | 9/1999 | Stoliar et al. | |
| 6,158,161 A | * | 12/2000 | Rossman | 43/42.06 |
| 6,286,246 B1 | * | 9/2001 | Rachal et al. | 43/42.25 |
| 6,317,949 B1 | | 11/2001 | Dotson | |

* cited by examiner

Primary Examiner—Charles T. Jordan
Assistant Examiner—Jordan M Lofdahl
(74) Attorney, Agent, or Firm—Edward M. Livingston

(57) ABSTRACT

Fishing hook bait attachment device (1) has a ring section (2) a middle section (3) extending from the ring section (2) and a distal section (4) having at least one tail extending outwardly therefrom. The distal section (4) not only enhances the attractiveness of the device to fish, it also provides a safe way of holding the device to keep fingers and hands away from the sharp tips (11) of hooks. A hole (6) in the middle section (3) is provided to insert the shaft of a hook (10) to prevent the device from falling off the hook (10) during use to avoid pollution and enable the device to be used multiple times. The device is preferably made of a resilient elastomeric material to enable it to be used with a wide variety of sizes of bait (7) and hooks (10). One or more sections of the device may be colored the same or differently or made luminescent so that it glows in the dark to make it more attractive to fish, particularly during night fishing.

18 Claims, 2 Drawing Sheets

FISHING HOOK BAIT ATTACHMENT DEVICE AND METHOD

BACKGROUND OF THE INVENTION

This invention relates to bait harness devices and more particularly to a device for attaching bait to a hook.

Attaching bait to a fishing hook so it doesn't fall off or get eaten by fish is a problem experienced by anyone who has gone fishing. One current method of attaching bait involves inserting copper wire through the jaw of the fish and wrapping the wire around the head of the fish. Another method involves wrapping rubber bands around the trolling wire and the nose of the fish. Unfortunately, these latter methods have met with little success in preventing loss of bait. Furthermore, such methods require the placement of the fingers and hands very close to the sharp tips of fish hooks which can result in severe cuts. Thus, the need exists for a device that will enable a fisherman to attach bait to a hook in a secure and safe manner.

The prior art includes many patents for attaching bait to a hook but none like the present invention. For instance, U.S. Pat. No. 6,317,949 issued to Dotson on Nov. 20, 2001 discloses using an elastic to secure together components of the fishing lure but does not relate to fastening same to a hook. U.S. Pat. No. 4,466,166 issued to Hogarth on Aug. 21, 1984 discloses a device for mounting a grip to a tennis racket. U.S. Pat. No. 3,271,890 issued to Davis on Sep. 13, 1966 discloses a device for attaching bait to a hook that uses rubber band along the length of the hook. U.S. Pat. No. 3,046,689 issued to Woodley Jul. 31, 1962 discloses a bait harness which also uses bands to attach the bait to the hook. U.S. Pat. No. 5,946,844 issued to Stoliar, et al. on Sep. 7, 1999 teaches a hook device for retrieving fishing flies which are caught in trees. U.S. Pat. No. 3,156,066 issued to Munyer on Nov. 10, 1964 discloses a resilient collar for attaching bait to a hook. U.S. Pat. No. 3,193,965 issued to Jacobsen on Jul. 13, 1965 discloses a plastic harness with a spring clip used for attaching fishing worms to a hook. U.S. Pat. No. 4,691,467 issued to Brimmer on Sep. 8, 1987 teaches a bait hook holder using a rubber band in a tube around a hook to provide holding loops extending from each end of the tube to wrap around the head and tail of the bait. U.S. Pat. No. 3,398,477 issued to Paluzzi on Aug. 27, 1968 discloses a fish hook bait harness that uses an adjustable harness mounted though a shank on the hook. U.S. Pat. No. 4,625,451 issued to Griffiths on Dec. 2, 1986 discloses a hook bait holder using a ring with barbs that closes around the bait. U.S. Pat. No. 2,605,579 issued to Chadwick on Aug. 5, 1952 discloses another hook bait holding contraption that uses criss-cross rubber bands. Finally, U.S. Pat. No. 4,785,571 issued to Beck on Nov. 22, 1988 discloses a fish hook live bait holder comprised of an elastic strap attached to bait hooks to the side of the fish hook between which bait is inserted.

As will be readily seen from the detailed description of the invention, none of the prior art teaches a bait attachment device having the structure and utility of the present invention.

SUMMARY OF THE INVENTION

The primary object of the present invention is to provide a fishing hook bait attachment advice that securely holds the bait to a hook.

A further object of the present invention is to provide such a device that is safe to use by keeping the fingers and hands away from the sharp points of fishing hooks.

An even further object of the present invention is to provide such a device that is ecologically safe by enabling it to be secured to the hook so it does not fall into the water during use.

An additional object of the present invention is to provide such a device that enhances the attractiveness of the bait to fish.

The present invention fulfills the above and other objects by providing a fishing hook bait attachment device made of resilient material that has a proximal ring section for circumventing the bait, a middle section attached to said ring section and a distal section extending from the middle section which has at least one tail extending outwardly therefrom. The middle section may have a hole through it for inserting a hook so that the attachment device does not fall off the hook during use, thus making it ecologically safe and enabling it to be used again and again. The attachment device would preferably be made of elastic material to enable it to fit a wide variety of sizes of bait, although the device itself may be made in a variety of sizes. The attachment device of the present invention may come in a variety of colors which would further enhance its attractiveness to fish. The present device could be made luminescent so that it would glow and make it even more attractive to fish, particularly in the dark during night fishing.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
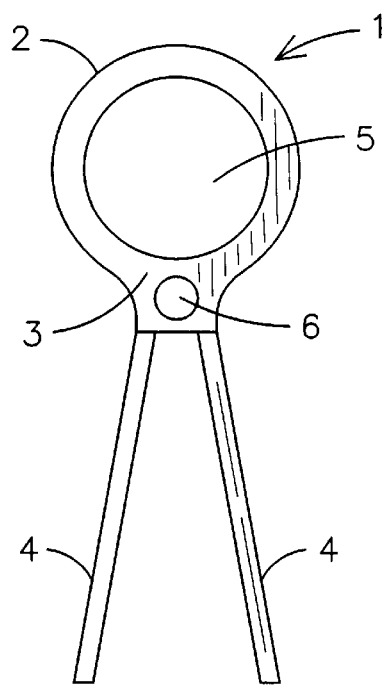
FIG. 1 is a front elevation view of the bait attachment of the present invention by itself.
Figure 2:
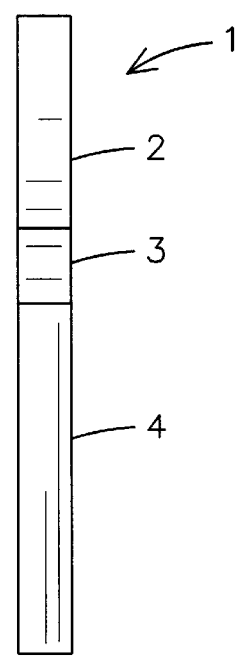
FIG. 2 is a side elevation view of the bait attachment device of the present invention by itself.

For purposes of describing the preferred embodiment, the terminology used in reference to the numbered components in the drawings is as follows:

1. Bait Attachment device
2. Ring section
3. Middle section
4. Distal tail section
5. Opening in ring
6. Hole in middle section
7. Bait
8. Fish line 9. Trailer hook
10. Front hook
11. Hook tip The preferred embodiment of the present invention is described by reference to the drawings. In FIGS. 1–2, the fishing hook bait attachment device 1 is shown to have a proximal ring section 2 having an opening 5 for inserting around the bait. A middle section 3 extends from the ring section 2. The middle section 3 may contain a hole 6 for inserting a hook, although the device could be used without a hole in the middle section 3 by merely inserting a hook with the bait through the opening 5 in one ring section 2. However, the hole 6 is preferred to be used to securely hold the device to a fishing hook 10 to keep it from falling off the hook during use, enabling the device to be used again if necessary and at the same time preventing pollution of the waterways with the device 1. The third and distal section of the device 4 consists of at least one tail 4, two tails being preferred.

Figure 3:
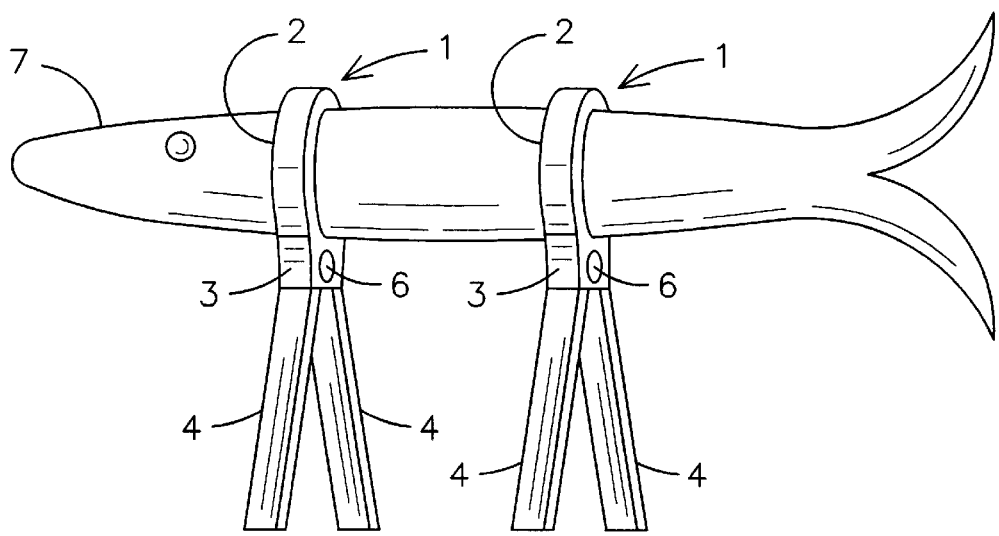
FIG. 3 is a side perspective view showing the bait attachment device of the present invention during the first step of a method of use of inserting the ring section of the device around the bait.
Figure 4:
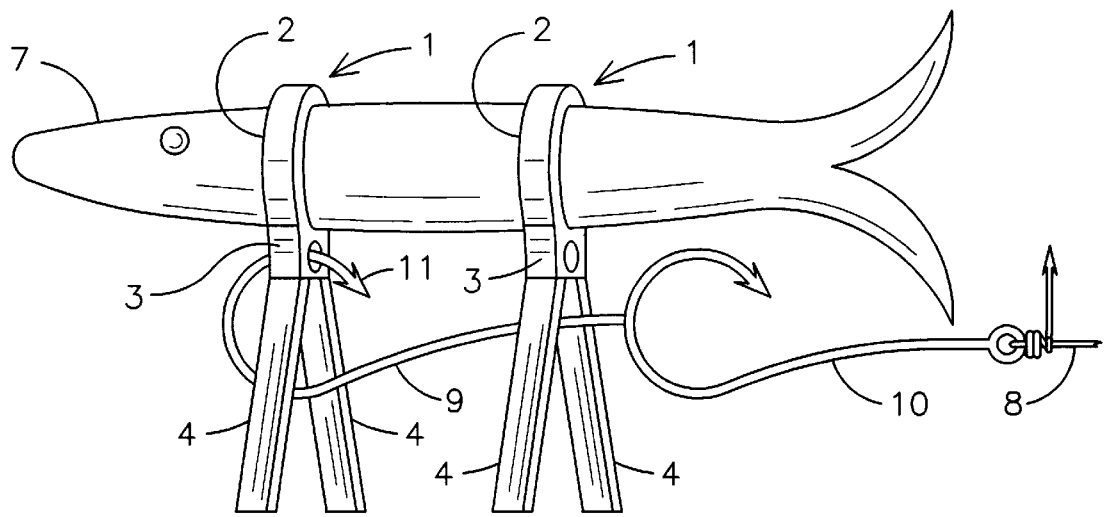
FIG. 4 is a side perspective view showing the second step of the method of use of placing a fishing hook though the hole in the middle section of the device.
Figure 5:
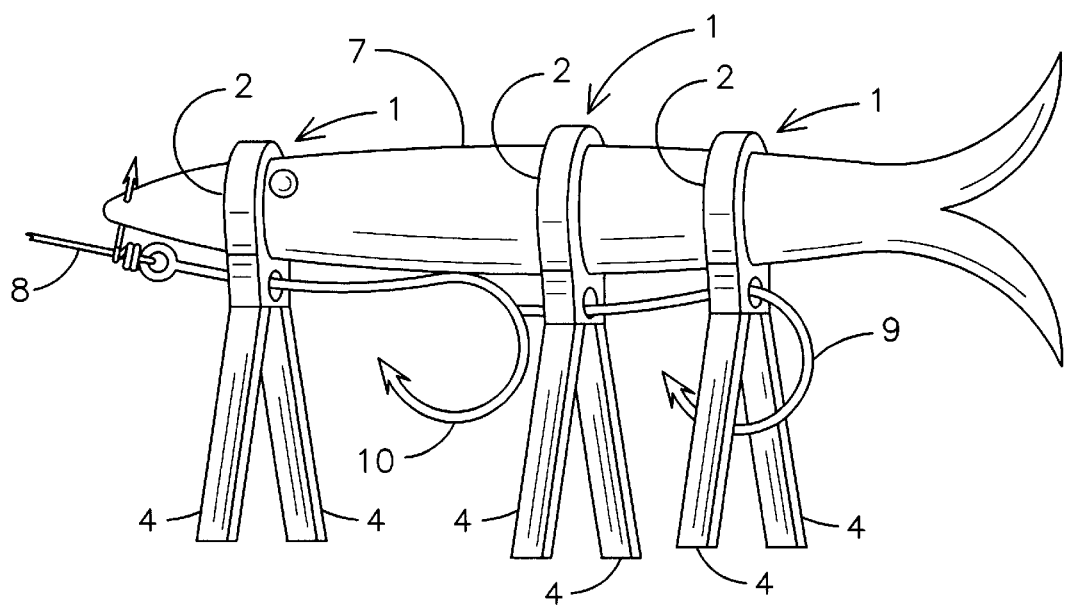
FIG. 5 is a side perspective view showing the final step of the method of use when the bait is securely attached to a fishing hook by the present invention

FIGS. 3–5 show multiple bait attachment devices 1 of present invention being used to attach bait 7, such as ballyhoo, to fishing hooks. As shown in FIG. 3 the bait 7 is inserted through the opening 5 in the ring section 2 to a desired position on the bait 7. The next step is illustrated in FIG. 4 wherein a hook, in this case the trailer hook 9, is inserted tip first 11 through the holes 6 in the middle section 3 of the bait attachment device 1. During this latter step the fingers on the fish are placed on the distal tail section 4 to keep the fingers away from the sharp tip 11 of the hook 9 to prevent sticking or cutting one's fingers. Finally, FIG. 5 shows the bait 7 securely fastened around the hooks 9 and 10, attached to a fishing line 8. A third additional attachment device 1 has been placed over the nose of the bait 7 to even more firmly secure it to the fishing hooks 9 and 10.

The present device would be preferably made of resilient elastomeric material so that it could be stretched to fit various sizes of fishing hooks. The entire device or section thereof, particularly the distal tail section 4, could be made in different colors to enhance its attractiveness to fish. The device could even be luminescent so it would glow in the dark to enhance its attractiveness during night fishing. Further, the distal tail section 4 not only provides a safe means of holding the device when using it to keep fingers and hands away from the tips to prevent sticking and cuts, but the tail section makes it more attractive to fish by providing additional simulated tails to the fishing bait.

Although only a few embodiments of the present invention have been described in detail hereinabove, all improvements and modifications to this invention within the scope or equivalents of the claims are included as part of this invention.

Having thus described my invention, I claim:

1. A fishing hook bait attachment device comprising:
   a resilient proximal ring section having an opening fully circumventing a bait;
   a middle section extending from the ring section; and
   a distal section in the same plane as the ring and middle sections having at least one tail extending outwardly from the middle section and away from the bait.

2. The fishing hook bait attachment device of claim 1 further comprising:
   a hole through the middle section for inserting a hook.

3. The fishing hook bait attachment device of claim 1 wherein:
   the device is made of elastomeric material to enable it to fit a variety of sizes of bait and hooks.

4. The fishing hook bait attachment device of claim 2 wherein:
   the device is made of elastomeric material to enable it to fit a variety of sizes of bait and hooks.

5. The fishing hook bait attachment device of claim 1 wherein:
   at least one section of the device is colored to enhance its attractiveness to fish.

6. The fishing hook bait attachment device of claim 2 wherein:
   at least one section of the device is colored to enhance its attractiveness to fish.

7. The fishing hook bait attachment device of claim 3 wherein:
   at least one section of the device is colored to enhance its attractiveness to fish.

8. The fishing hook bait attachment device of claim 4 wherein:
   at least one section of the device is colored to enhance its attractiveness to fish.

9. The fishing hook bait attachment device of claim 1 wherein:
   at least one section of the device is made luminescent so that it glows in the dark to make it more attractive to fish particularly during night fishing.

10. The fishing hook bait attachment device of claim 2 wherein:
    at least one section of the device is made luminescent so that it glows in the dark to make it more attractive to fish particularly during night fishing.

11. The fishing hook bait attachment device of claim 3 wherein:
    at least one section of the device is made luminescent so that it glows in the dark to make it more attractive to fish particularly during night fishing.

12. The fishing hook bait attachment device of claim 4 wherein:
    at least one section of the device is made luminescent so that it glows in the dark to make it more attractive to fish particularly during night fishing.

13. The fishing hook bait attachment device of claim 5 wherein:
    at least one section of the device is made luminescent so that it glows in the dark to make it more attractive to fish particularly during night fishing.

14. The fishing hook bait attachment device of claim 6 wherein:
    at least one section of the device is made luminescent so that it glows in the dark to make it more attractive to fish particularly during night fishing.

15. The fishing hook bait attachment device of claim 7 wherein:
    at least one section of the device is made luminescent so that it glows in the dark to make it more attractive to fish particularly during night fishing.

16. The fishing hook bait attachment device of claim 8 wherein:
    at least one section of the device is made luminescent so that it glows in the dark to make it more attractive to fish particularly during night fishing.

17. A method of using a fishing hook bait attachment device comprising a resilient proximal ring section having an opening fully circumventing a bait; a middle section extending from the ring section; a distal section in a same place as the ring and middle sections having at least one tail extending outwardly from the middle section and away from the bait; and a hole through the middle section for inserting a hook, comprising the steps of:

inserting bait into the opening of the ring section of at least one device; and placing at least one hook through the hole in the middle section so that at least one device by holding the distal tail section with the fingers if necessary to keep fingers away from tip of a fishing hook.

18. A method of using a fish and hook bait attachment device comprising a resilient proximal ring section having an opening fully circumventing a bait; a middle section extending from the ring section; a distal section having at least one tail extending outwardly from the middle section; and a hole through the middle section for inserting a hook, comprising the steps of:

placing at least one hook through the hole in the middle section so that at least one device by holding the distal tail section with the fingers if necessary to keep fingers away from tip of a fishing hook; and inserting bait into the opening of the ring section of at least one device.

\* \* \* \* \*